R. H. TALBUTT.
ELECTRIC COFFEE ROASTER.
APPLICATION FILED APR. 6, 1910.
1,012,293.
Patented Dec. 19, 1911.
3 SHEETS—SHEET 1.
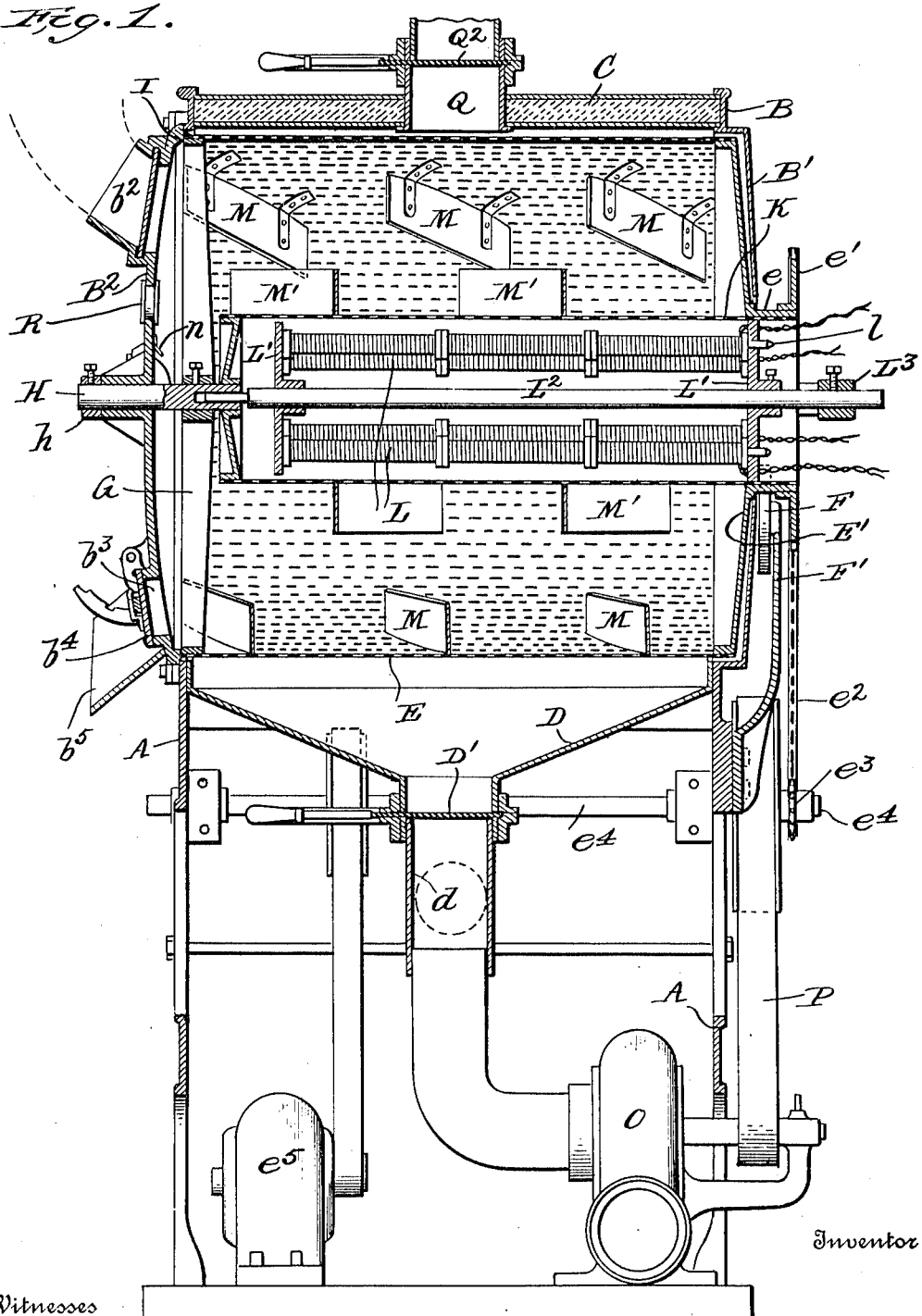

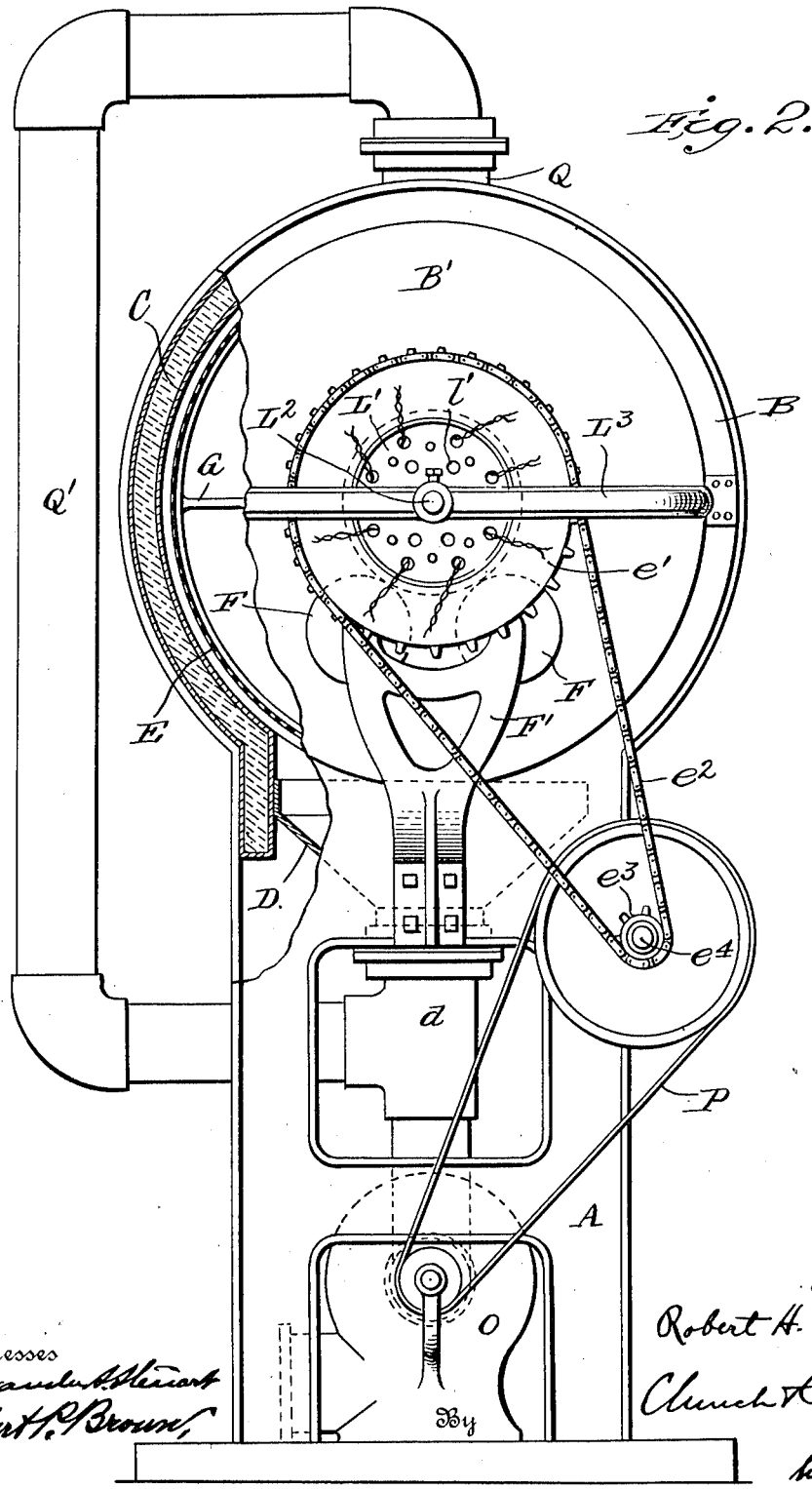

R. H. TALBUTT.
ELECTRIC COFFEE ROASTER.
APPLICATION FILED APR. 6, 1910.
1,012,293.
Patented Dec. 19, 1911.
3 SHEETS—SHEET 3.
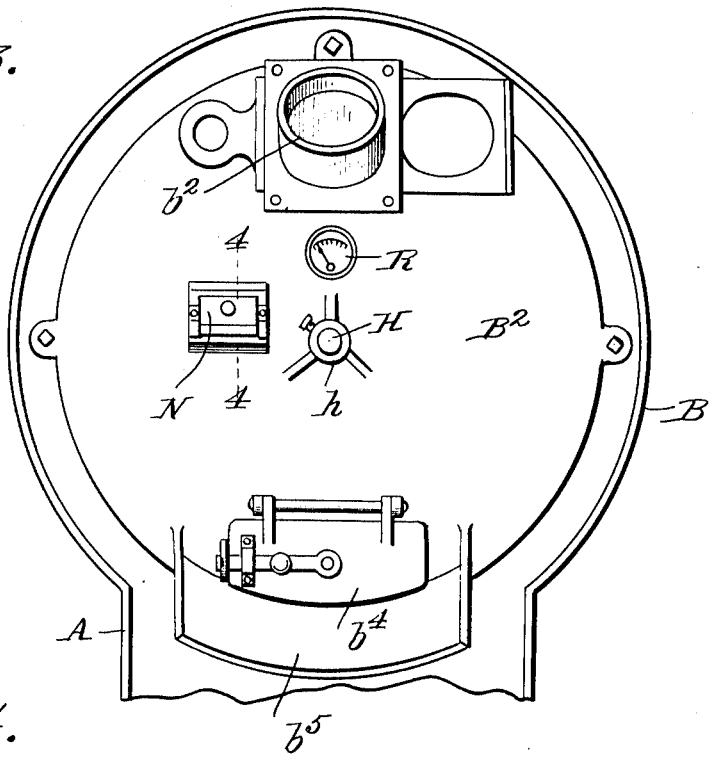
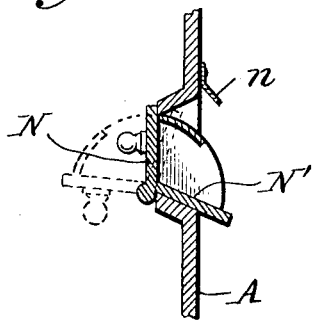
Witnesses
Alexander B. Stuart
Halbert P. Brown
Inventor
Robert H. Talbutt
By Church & Church
his Attorneys

UNITED STATES PATENT OFFICE.

ROBERT H. TALBUTT, OF BALTIMORE, MARYLAND, ASSIGNOR TO JAMES E. BAINES, TRUSTEE, OF WASHINGTON, DISTRICT OF COLUMBIA.

ELECTRIC COFFEE-ROASTER.

1,012,293.   Specification of Letters Patent.   Patented Dec. 19, 1911.

Application filed April 6, 1910. Serial No. 553,710.

*To all whom it may concern:*

Be it known that I, ROBERT H. TALBUTT, a citizen of the United States, residing at Baltimore city, in the State of Maryland, have invented certain new and useful Improvements in Electric Coffee-Roasters; and I do hereby declare the following to be a full, clear, and exact description of the same, reference being had to the accompanying drawings, forming a part of this specification, and to the figures and letters of reference marked thereon.

This invention relates to coffee roasters of that type wherein a rotary container is usually located within a casing and adapted for the reception of the coffee or material to be roasted, the objects of the invention being to provide a machine competent to roast coffee by the use of electrical heating apparatus in such manner that the roast will be uniform throughout the mass of material and with which, while the moisture driven out of the berries during the roasting operation may be quickly and easily withdrawn, the heat will be conserved and utilized to the best possible advantage, thus economizing in the consumption of energy and enabling the coffee to be roasted without contamination by the action of deleterious gases, such as are created in the presence of actual combustion or where the roasting proceeds without the withdrawal of the moisture and initial emanations from the berries.

A further object of the invention is to provide a novel arrangement of the electric heating apparatus in connection with the container for the coffee whereby practically the entire radiant heat energy will be utilized in performing the roasting operation, the apparatus differing in this respect from roasters heretofore proposed, in which the electric heaters have been located within an imperforate rotary drum but on the outer side of a foraminous container for the berries.

A further object of the invention is to provide a roaster embodying an electric heater so located and supported that commutator rings or contacts movable with relation to each other in the operation of the machine may be entirely eliminated whereby the electrical equipment may be simplified and its efficiency increased.

While the machine forming the subject-matter of the present application is primarily designed for roasting coffee berries, it will be understood that it is susceptible of use for roasting other commodities such, for instance, as cereals, peanuts, etc.

Referring to the accompanying drawings—Figure 1 is a section taken in a vertical plane longitudinally of the axis of a machine embodying the present improvements; Fig. 2 is an end elevation of the machine with a portion of the casing broken away and in section; Fig. 3 is a detail in elevation looking at the end opposite to that shown in Fig. 2; and Fig. 4 is a detail section on the line 4—4 of Fig. 3, showing the construction of the sampling device.

Like letters of reference in the several figures indicate the same parts.

In its general construction the machine embodying the present invention illustrated in the accompanying drawings has end frames A, the upper portions of which are made circular, as indicated at B. One of said frames may be formed integral with an end head B' having a relatively large central aperture, while the other frame is adapted for the reception of a removable head $B^2$ which head, however, is secured rigidly in place by suitable bolts or screws when the machine is assembled. Extending between and connecting the circular portions B of the frames is a cylindrical frame or casing C, preferably constructed with sheet metal interior and exterior walls and with the intermediate space filled with a suitable heat insulating material. At the bottom the cylindrical casing is provided with an opening, preferably extending longitudinally from one end frame to the other and having located within it a chaff collecting hopper D, said hopper D also preferably serving as the opening through which the moisture laden air is discharged or drawn away during the initial portion of the operation, as will be presently explained. Mounted within the framing formed by the end frames, heads, and cylindrical casing C, is a foraminous cylinder E, said foraminous cylinder having at one end an imperforate head E' with an enlarged trunnion e extending through the central aperture in the head B' and adapted to be supported by anti-friction rollers F journaled in a bracket F' carried by the end frame A. At its opposite end the cylinder E is provided with a spider frame G preferably adjustably mounted on the inner end of a short shaft H, journaled in the head B² and having at its outer end an adjustable collar $h$ whereby the longitudinal position of the shaft and cylinder may be adjusted to bring the circular periphery of the spider into juxtaposition to the inner edge of the head B² at the point indicated by the reference letter I, thereby making a joint sufficiently tight to prevent the passage of materials being treated. While the end of the cylinder in proximity to the head B² is held close to said head, a sufficient space is left between the opposite end or head of the cylinder and the head B' to permit expansion and contraction under variations in temperature without causing friction or contact of the parts. Within the foraminous cylinder E there is a second and smaller foraminous cylinder K preferably having a diameter approximately equal to the internal diameter of the trunnion $e$. Said inner cylinder is open and connected rigidly with the trunnion $e$ at one end, while its opposite end is closed and freely supported on the inner end of the shaft H, thus the inner cylinder K may expand and contract with relation to the outer cylinder without creating stress in the parts and as the expansion and contraction of the two cylinders will be practically simultaneous, their relative positions will remain constant but each is free to come and go independently of the other.

The inner cylinder K is adapted for the reception of an electric heater, which latter may be slipped in through the trunnion $e$ and open end of the cylinder without disturbing any of the working parts of the machine. The heater preferably consists of a plurality of porcelain or clay bobbins wound with resistance wire indicated by the reference letter L, such bobbins being usually arranged in multiple with each other, so that one or more of them may be cut in or out in accordance with the heat requirements at any particular time. Conveniently, the resistance bobbins are mounted on rods $l$ supported in heads L' and the heads are carried by a shaft L² which, at its inner end, is mounted so as to be capable of longitudinal movement in the inner end of the shaft H and at its outer end is adjustably mounted in a removable yoke or bracket L³, best seen in Fig. 2 of the accompanying drawings, but it is obvious that other kinds of electrical heaters may be employed. One of the heads L' is preferably located in the trunnion $e$ and this head is also preferably made of asbestos or heat insulating material, whereby the escape of radiant heat through the trunnion is, to a large extent, prevented but for the admission of a limited quantity of air to supply air for displacing the moisture laden air withdrawn during the initial portion of the roasting operation the head L' is provided with small air admission apertures $l'$, shown in Fig. 2 of the accompanying drawings.

Rotation is preferably imparted to the foraminous cylinders by means of a sprocket wheel $e'$ on the trunnion $e$, connected by a chain $e^2$ with a sprocket wheel $e^3$ on a counter-shaft $e^4$ driven from a motor or prime mover $e^5$ and, in order to agitate and stir the coffee, the outer cylinder is provided with an internal series of diagonally arranged vanes M, while the inner cylinder is provided with a series of vanes M', also arranged diagonally but inclined at an opposite angle to the vanes on the outer cylinder, thus the coffee moved in one direction by the vanes M will be moved in the opposite direction by the vanes M', the result being a back and forth movement of the coffee which keeps the same effectually stirred and at the same time the coffee is elevated on the rising sides of the cylinders and drops over the inner cylinder, as will be readily understood from an inspection of Fig. 1.

The head B² is provided near the top with a damper controlled entrance opening $b^2$ through which the coffee or material to be roasted may be introduced from a hopper indicated in dotted lines in Fig. 1, and at the bottom said head is provided with a discharge opening $b^3$ provided with an outwardly swinging door or grate $b^4$ which may be opened to discharge the coffee or other material from the cylinder when the roasting operation is completed. A spout or chute $b^5$ is conveniently arranged around the underside of the discharge opening so as to conduct the material away from the machine and into a suitable receiver, such as a cooling apparatus.

For determining the progress of the roasting operation, the head B² is provided with a sampling aperture adapted for the reception of a rocking sampler N, which, while it normally occupies the position shown in Fig. 4 with its inner wall N' inclined downwardly so as to discharge the coffee into the cylinder, it may be tilted back to the position indicated in dotted lines and, as it moves outwardly on its pivot, the coffee being elevated by the vanes will drop into the same thereby filling the sampler with a sufficient quantity for the desired inspection. The inner wall N' of the sampler will close the aperture when the sampler is open to prevent the escape of heat and fumes which might interfere with an inspection of the coffee at that point. In effect, the sampler constitutes a tilting receptacle which is normally in position to discharge its contents into the cylinder, but which is adapted to receive and retain a portion of the material during the time the sampler is being turned to its open position. An inclined guard $n$ serves to prevent coffee passing into the sampler after it has been moved sufficiently far to open on the outer side of the head, whereby spilling of the coffee through the sampler is prevented.

The hopper bottom D of the inclosing framing or casing hereinbefore referred to is provided with a discharge opening or conduit $d$ leading down to a rotary fan O driven by a belt P from the counter-shaft $e^4$ and said conduit or pipe $d$ is preferably controlled by a sliding damper or gate D' whereby it may be opened more or less to permit of the withdrawal of the heavier moisture laden atmosphere and gases from the roaster. The heavier air and gases will, in the operation of the machine, naturally settle, together with chaff and dirt passing out through the foraminous cylinder down in the bottom of the hopper. While under ordinary circumstances and in ordinary operation, the bottom withdrawal of the moisture laden air, gases, chaff, etc., is all that is necessary or desirable, in operating on some materials it may be found desirable to also withdraw gases from the top of the casing, and for this purpose a discharge opening Q is located in the top of the casing and connected by a branch pipe Q' with the duct or pipe $d$ leading to the suction fan O. The top discharge aperture Q is also provided with a sliding gate or damper indicated by the letter $Q^2$ and the connection between the pipes Q' and $d$ is below the damper or gate D' whereby gases within the cylinder and casing may be withdrawn either entirely from the bottom or entirely from the top or partly from both bottom and top, thus permitting of a regulation of the action of the machine which will adapt it for practically any conditions of use or for operation upon materials of widely different character.

The temperature within the casing is indicated by a thermometer shown at R in Fig. 3, thus temperature may be known with certainty and by a proper observation or reading of the thermometer the heat may be maintained at any desired temperature during the roasting operation, thus eliminating to a large extent the necessity for skilled labor to observe the condition of the coffee as the roast progresses.

In the operation of roasting with the present apparatus it is found that the heat may be maintained more uniformly at the desired degree than has heretofore been possible with the so-called gas or coal roasters; there is little or no danger of the coffee being scorched or burned by contact with superheated surfaces or by passing through flames or in proximity to a flame the heat of which may, and of necessity does, vary at different points and, furthermore, practice demonstrates that coffee of different grades or kinds, such as are blended to give qualities not possessed by a single grade or kind of coffee, may be first blended and then roasted in a uniform manner. In other words, the coffee being blended as a preliminary step to the roasting operation and all of the different grades of coffee subjected to the same roasting operation will result in a beverage of much finer quality and flavor. Practice further demonstrates that, with an apparatus such as herein described, coffee may be roasted with a smaller percentage of loss in weight than in roasters employing a gas heater, and the berries seemingly retain a greater percentage of the volatile elements without any searing or burning of the exterior.

Having thus described my invention, what I claim as new and desire to secure by Letters Patent of the United States, is:—

1. In a coffee roaster, the combination with a rotary cylinder for the coffee to be roasted, a heat insulating inclosure for said cylinder, and means for discharging moisture laden air from the cylinder during the roasting operation, of a centrally located shaft, an electric heater mounted on the shaft and extending longitudinally of the axis of the cylinder, and an inner foraminous cylinder surrounding said heater.

2. In a coffee roaster, the combination with a rotary cylinder for the coffee to be roasted, a heat insulating inclosure for said cylinder, and means for discharging moisture laden air from the cylinder during the roasting operation, of a stationary centrally located shaft, an electric heater mounted in fixed position on the shaft and extending longitudinally of the axis of the cylinder, and an inner foraminous cylinder surrounding the said heater.

3. In a coffee roaster, the combination with a rotary cylinder for the coffee to be roasted, and a fixed framing surrounding and in which the cylinder is journaled, of a fixed central shaft, an electric heater extending longitudinally of the cylinder and supported by the shaft in fixed position with relation to the cylinder.

4. In a coffee roaster, the combination with a rotary cylinder for the coffee to be roasted and a fixed inclosing framing in which the cylinder is journaled, of a centrally arranged shaft, an electric heater located centrally of the cylinder and supported by the shaft in fixed position independently of the cylinder.

5. In a coffee roaster, the combination with a foraminous rotary cylinder for the coffee to be roasted and an inclosing framing having a hopper bottom with a damper controlled discharge therein for chaff, etc., of a centrally arranged electric heater extending longitudinally of the axis of the cylinder, and a central shaft having end bearings for supporting said heater in fixed position with relation to the cylinder.

6. In a coffee roaster, two concentric cylinders, the inner cylinder being open at one end for the reception of an electric heater and connected rigidly at its open end with the outer cylinder, the opposite end of the inner cylinder being free to move parallel with the axis in expanding and contracting under variations in temperature.

7. In a coffee roaster, the combination with an outer foraminous cylinder open at one end and having a head and enlarged trunnion at the opposite end, of an inner cylinder having one end open for the reception of an electric heater and connected rigidly with the head of the outer cylinder, the opposite end of the inner cylinder being closed and free to move axially independently of the outer cylinder.

8. In a coffee roaster, the combination with an outer foraminous cylinder open at one end and an inner cylinder connected at one end only with the outer cylinder whereby the cylinders may expand and contract independently, of an electric heater within the inner cylinder and a support for said heater freely supported at one end to permit of expansion and contraction independently of the cylinders.

9. In a coffee roaster, the combination with a rotary outer cylinder and an inner foraminous cylinder open at one end and connected with the outer cylinder, of an electric heater removably mounted in the inner cylinder, and a head for closing the inner cylinder when the heater is in place therein.

10. In a coffee roaster, the combination with an inclosing framing, a cylinder journaled to rotate in said casing and having an open trunnion at one end, and an inner foraminous cylinder having one end open and connected to said trunnion, of an electric heater mounted in the inner cylinder and removable through said trunnion and a head for closing the trunnion when the heater is in position in the cylinder.

11. In a coffee roaster, the combination with an inclosing framing having oppositely disposed heads, and a short shaft mounted in one of said heads, of a foraminous cylinder having at one end a spider support connected with said shaft whereby the end of the cylinder is held in proximity to the head, and having at the opposite end an open trunnion passing through the other head, an inner foraminous cylinder having an open end connected with the trunnion and its opposite end freely supported by the shaft whereby the cylinders may expand and contract independently, and a heater mounted in fixed position in the inner cylinder and removable through said trunnion.

12. In a coffee roaster, an inclosing framing embodying a cylindrical casing having a head at one end with supply and discharge openings therein, a rotary foraminous cylinder in the casing having its open end in proximity to the supply and discharge openings, a central fixed shaft an electric heater located centrally within the cylinder and supported on said shaft on an axis coincident with the axis of the cylinder, and a damper controlled discharge opening for moisture laden air.

13. A coffee roaster, the combination with an inclosing framing embodying a cylindrical casing, oppositely disposed heads for said casing and a bottom hopper provided with a damper controlled discharge, of a foraminous cylinder located in said casing, a short shaft mounted in one of said heads and supporting one end of the cylinder, an open trunnion connected with the opposite end of the cylinder and projecting through the head at that end of the casing, an inner foraminous cylinder open at one end and at its open end connected with the trunnion, whereby the inner cylinder is open to the exterior of the machine, a centrally located shaft supported in fixed position in the cylinder, an electric heater mounted on said shaft within the cylinder, and a head for closing the trunnion when the heater is in position.

14. In a coffee roaster, the combination with the inclosing framing embodying a cylindrical casing, having a hopper bottom with a damper controlled discharge and heads at the opposite ends of the casing, of a foraminous cylinder mounted within the casing and having at one end a spider and at the opposite end a large open trunnion projecting through the head of the inclosing casing, a short shaft mounted in one head and constituting the support on which the spider is mounted, anti-friction wheels on which said trunnion is supported, an inner foraminous cylinder having one end open and connected with said trunnion and at its opposite end loosely supported by the shaft whereby the cylinders are free to expand and contract independently, and a heater mounted in the inner cylinder and removable through said trunnion.

15. In a coffee roaster, the combination with an inclosing framing embodying a cylindrical casing having a hopper bottom and oppositely disposed head, of discharge ducts leading from the top of said casing and bottom of the hopper, respectively, dampers controlling said discharge ducts, an exhaust fan with which said ducts communicate, a foraminous cylinder journaled within the inclosing framing, an inner foraminous cylinder located centrally of the first mentioned cylinder and having one end open through the head of the first mentioned cylinder and head of the inclosing casing, and a heater mounted in said inner cylinder and removable through the open end of the same.

16. In a coffee roaster, the combination with the foraminous cylinder having a head at one end provided with a relatively large open trunnion, a spider at the opposite end of said cylinder, an inclosing framing for the cylinder having oppositely disposed heads, one of said heads having a central shaft mounted thereon and connected with the spider whereby the open end of the cylinder will be held in proximity to the head and said head being provided at top and bottom, respectively, with coffee supply and discharge openings, dampers controlling said opening, and supporting bearings for the trunnion, of an inner cylinder having one end open and connected with the trunnion, a fixed shaft removably mounted in the inner cylinder, and an electric heater carried by said shaft.

17. In a coffee roaster, the combination with the inclosing framing, a rotary cylinder journaled therein and elevating and stirring vanes carried by the cylinder, of a pivotally mounted sampler having a bottom wall normally inclined to discharge the coffee into the cylinder and movable into position to receive and retain coffee delivered by the vanes and to expose said coffee for inspection and a fixed deflector above said sampler and beneath which the sampler moves for preventing the delivery of coffee thereto when the sampler opening is open to the exterior of the machine.

18. In a coffee roaster, a rotary cylinder, a framing inclosing said cylinder and having a sampling opening therein and means for heating the cylinder, of a sampling vessel pivotally mounted in said opening and having a front wall normally adapted to close the opening, an inner wall normally in inclined position to discharge the contents of the sampler into the cylinder, said inner wall being in position to close the opening when the sampler is turned to expose its contents for inspection.

19. In a coffee roaster embodying a rotating cylinder having means whereby the coffee is elevated and stirred and an inclosing framing provided with a head having a sampler opening therein, of a vessel pivotally mounted in said opening and having two walls inclined at an obtuse angle with relation to each other, one of said walls being adapted to close the opening when the vessel is turned inwardly and the other of said walls being adapted to close the opening when the vessel is turned outwardly to expose its contents for inspection.

ROBERT H. TALBUTT.

Witnesses:
ALEXANDER S. STEWART,
THOMAS DURANT.